Dec. 23, 1958   R. LAMATINA   2,865,280
APPARATUS FOR MAKING TOASTED POCKET IN A BUN
Filed Dec. 19, 1956   3 Sheets-Sheet 1

INVENTOR.
RICHARD LAMATINA
BY
Harry H. Hitzeman
ATTORNEY.

Dec. 23, 1958 R. LAMATINA 2,865,280
APPARATUS FOR MAKING TOASTED POCKET IN A BUN
Filed Dec. 19, 1956 3 Sheets-Sheet 3

INVENTOR.
RICHARD LAMATINA
BY
*Harry H. Fitzman*
ATTORNEY.

United States Patent Office 2,865,280
Patented Dec. 23, 1958

2,865,280

APPARATUS FOR MAKING TOASTED POCKET IN A BUN

Richard Lamatina, Chicago, Ill.

Application December 19, 1956, Serial No. 631,989

3 Claims. (Cl. 99—332)

My invention relates to apparatus for making pockets in buns of the type that are used for sandwiches.

My invention relates more particularly to an apparatus which automatically forms a pocket in a bun, heating the walls of the cavity and the peripheral edge about the cavity simultaneously.

My invention further contemplates the provision together with apparatus for making the pocket above described, of a heating means for toasting the lower surface of the upper portion of the bun that has been sliced off to provide the top of the sandwich.

Buns prepared in the manner above described are especially desirable for sandwiches with hot or cold food combinations, such as ground beef, barbecued meat, egg salad, ham salad, chicken salad, tuna fish, etc. These are all sandwiches of the type in which the filling is loose, and when this filling is placed between slices of bread or between the top and bottom of a sliced bun and is eaten, the food particles are frequently spilled on the person's clothes, the table and the floor.

The principal object of the present invention is to provide an improved apparatus for preparing a bun in the manner above described, the apparatus being such that the operator places the bun portions in the machine, and when the action of forming a cavity and toasting the walls of the cavity, the peripheral edge about the same, and the bottom side of the top of the bun has been completed, an audible and visible alarm is sounded and the mechanism is also stopped so that burning or scorching of the prepared parts of the bun is prevented.

A further object of the invention is to provide an automatic machine of the type described which is adjustable both as to the degree of heat desired, the depth of the cavity desired, and the length of time for performing the operation.

Other objects and advantages will be more apparent from the following description wherein reference is had to the accompanying drawings, upon which:

Figure 1:
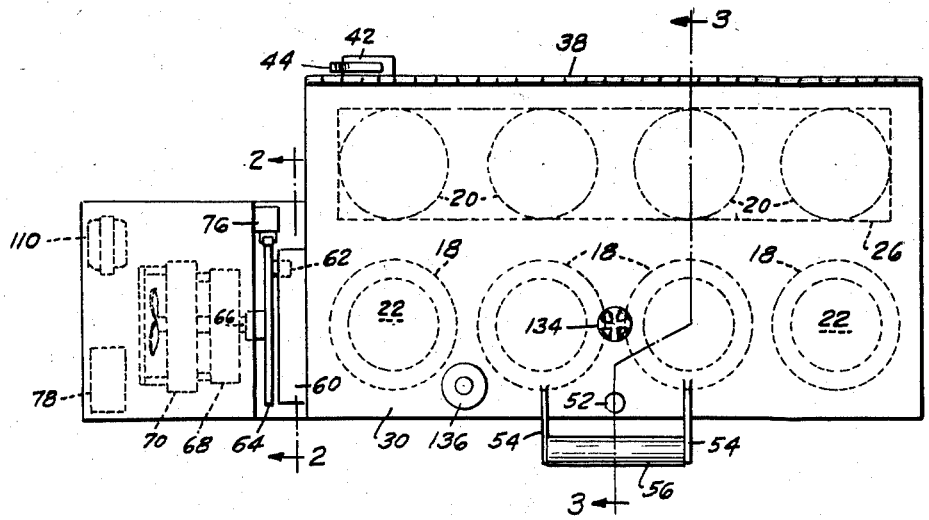
Fig. 1 is a plan view of a machine embodying the invention.

In the embodiment of the machine which I have chosen to illustrate and describe the invention, the machine generally may comprise a base casting 10 which may have the front and back walls 12 and 14 and a top wall 16 provided with two rows of cavities 18 and 20. Each of the cavities 18 has a bottom wall 18a and a cylindrical side wall 18b of a size to receive the lower part of a generally standard size bun B of the type used for hamburgers and similar sandwiches.

Each of the cavities 20 has a bottom wall 20a and an arcuate peripheral side wall 20b, the cavity being comparatively shallow to receive the top B' of a bun in a slightly compressed condition.

The heaters for toasting a pocket or cavity in the bun sections B are in the nature of cylindrical plungers 22 having a concentric flange 24 which extends beyond the edge of the opening 18 so that when the bottom section of a bun B is placed in the same it will be slightly compressed about its peripheral edge $B^2$ and an opening $B^3$ will be impressed therein.

The upper surface of the bun tops B' are heated by a flat strip heater 26 which extends across all four of the cavities 20 shown in the drawings. The heaters 22 are carried by a frame 28 fastened to the hinged cover plate 30 and the strip heater 26 is also carried by a bracket 32 from the cover plate 30.

The cover plate 30 may be mounted at the lower end of its back wall 36 on a hinge pin 38 which is carried by a hinge strip 40 fastened to the back of the back wall 14 of the base casting 10. A buzzer shut-off switch 42 is mounted on the back of the hinge plate 40 and is actuated by a spring-pressed arm 44 which is depressed when the cover plate 30 is raised, as will be hereinafter described.

Means for adjusting the depth of the cavity to be made in the bun section B may include a post 46 mounted on the top of the base 10 and an adjusting screw 48 mounted in a boss 50 of the cover plate 30, the adjusting screw having a knurled head 52 which may be turned to raise or lower the distance of downward travel of the plungers 22. A pair of arms 54 extend forward from the cover plate 30 to support a handle 56 for raising or lowering the cover plate 30 on the hinge 38.

Figure 2:
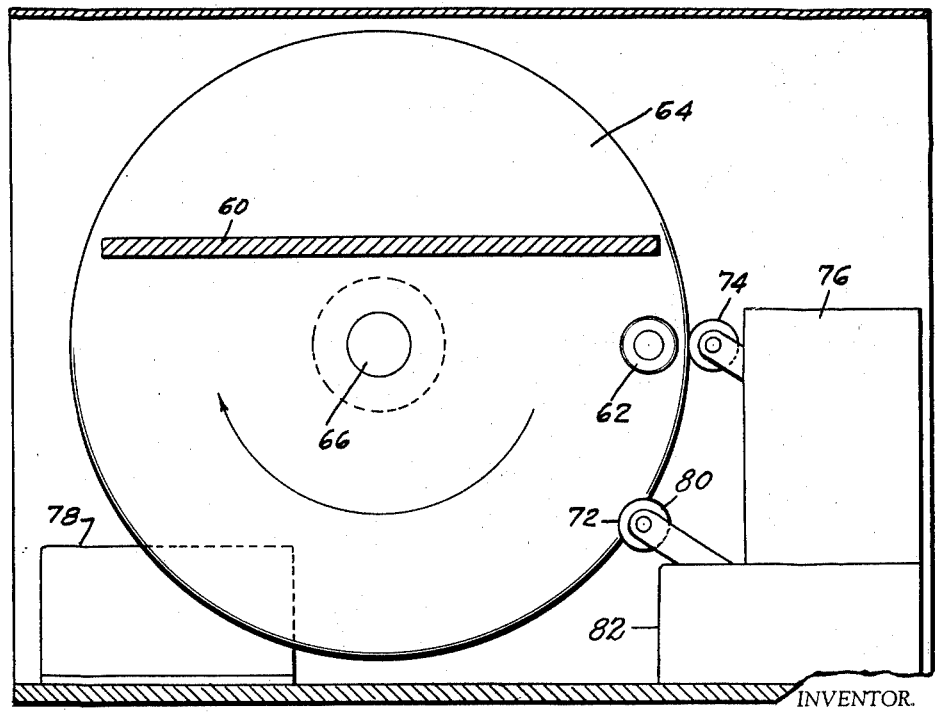
Fig. 2 is a cross-sectional view showing the driving mechanism and associated parts for operation of the machine and is taken on the line 2—2 of Fig. 1.
Figure 3:
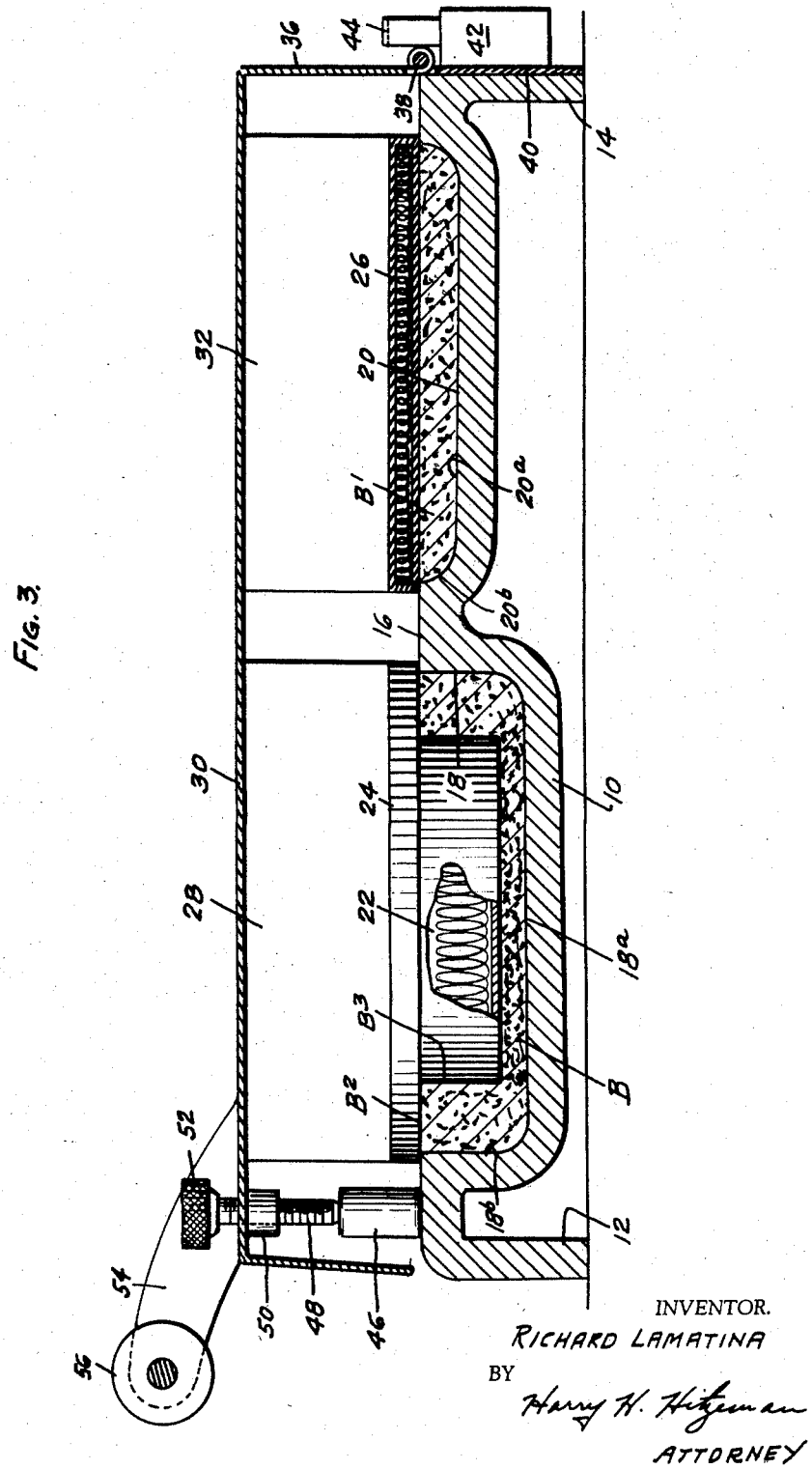
Fig. 3 is a cross-sectional view through the center of the machine, taken generally on the line 3—3 of Fig. 1.

Means for timing the toasting period and for raising the plungers 22 and strip heater 26 from engagement with the two sections of the bun may include a side plate 60 on one side of the cover 30 which is in the path of a roller 62 mounted on the face of a flat disc 64. The disc 64 is mounted on the end of a drive shaft 66 extending from a gear reducer 68 at the forward end of a pulsating motor 70 of the type usually found in electric clocks. The disc 64 carries the roller 62 on its face, and as it is rotated in a clockwise direction (as shown by the arrow, Fig. 2), it engages under the lifting plate 60 to raise the cover plate 30 and the heating elements from engagement with the portions of the buns. The time element required for toasting is determined by the length of time that it takes for the roller to descend from a starting position and travel up and under and raise the lifting plate at the end of the toasting operation.

The disc 64 also has an arcuately shaped notch 72 in its periphery, the notch being located with respect to the roller 62 so that when the cover plate 30 is lifted the spring-pressed roller 74 of a buzzer switch 76 will engage the notch and start an electric buzzer 78, creating an audible signal that the toasting operation is finished. The operator then raises the cover about the hinge 38 until the back wall 36 of the same descends upon the spring-pressed arm 44 of the buzzer shut-off switch 42. The motor continues to drive the disc 64 until the notch 72 is engaged by the roller 80 of a motor shut-off switch 82 which then operates to shut off the motor 70.

In a preferred arrangement of the timing sequence above described, it is desirable to have the following time intervals: when the heating members are lowered for engagement with the buns and the motor is started by releasing the switch 42, the disc 64 will travel in a clockwise direction (see Fig. 2) through the duration of about 60 seconds and engage the bottom of the lift-up plate 66 and start to raise the cover 30 carrying the heating elements to remove the same from engagement with the bun sections. The preferred period of time for raising the cover until the audible buzzer is sounded is 15 seconds, and the preferred time for permitting the buzzer to ring until the notch 72 engages the roller 88 of the motor shut off switch is 7 seconds. Therefore the total time required for a complete cycle of operation of the machine is one minute and 22 seconds.

Figure 4:
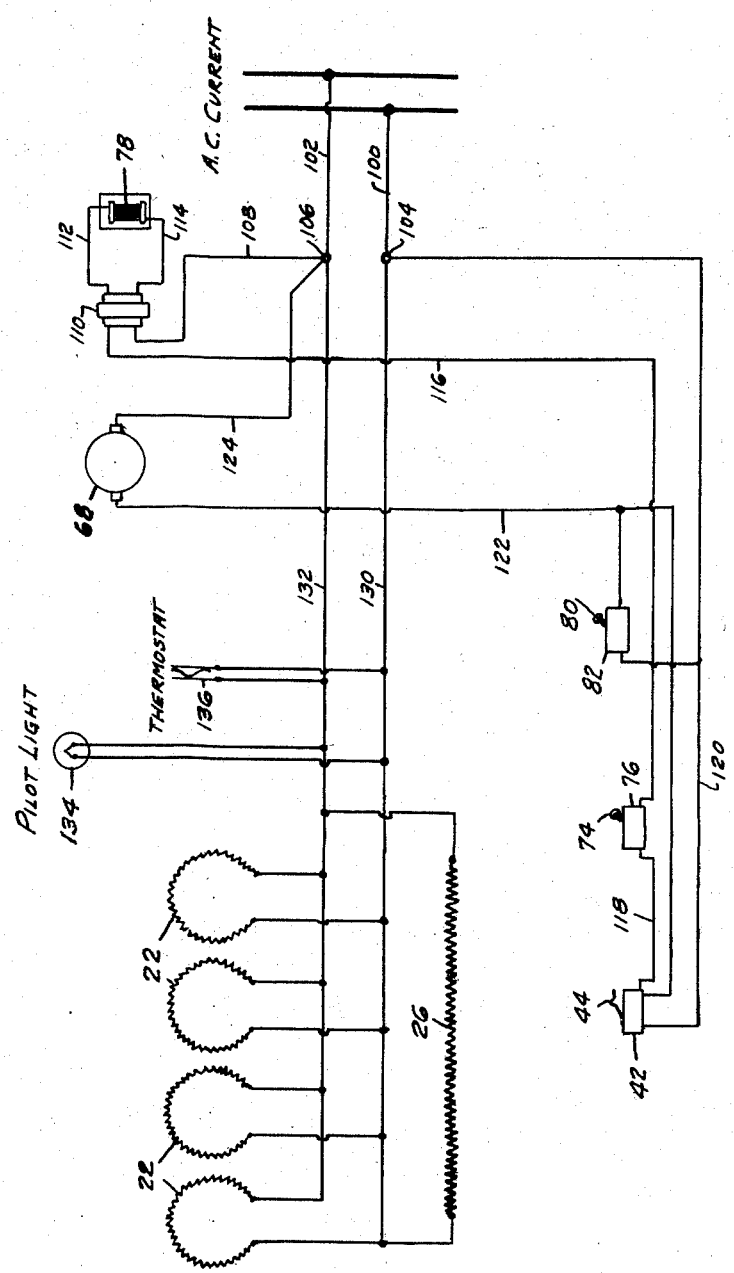
Fig. 4 is a wiring diagram showing the circuit for the automatic control of the mechanism.

The electrical control and function is best shown in the wiring diagram, Fig. 4, wherein leads 100 and 102 may extend from a source of alternating current to a pair of terminal posts 104 and 106. A lead 108 may go to a transformer 110 from which a lead or connector 112 extends to one side of a standard electric buzzer 78, and the return lead 114 being connected back to the transformer.

A connector 116 extends from the transformer to the micro switch or buzzer switch 76 which carries the roller 74 for opening and closing a circuit through the same. A connector 118 may extend from the switch 76 to a second switch 42 which has the spring-pressed arm 44 that is operated when the cover is lifted back to shut off the circuit through the buzzer switch and buzzer. The connector 120 extends from this switch to the terminal post 104.

The switch 42 also operates to shut off the motor 68, being connected thereto by an electrical conduit 122 that extends through the motor shut-off switch 82 which is operated by the spring-pressed roller 80 to break the circuit to the motor. The other lead or conduit 124 to the motor 68 connects with the terminal post 106. The heaters may be connected in parallel by the electrical conduits 130 and 132, both conduits having leads connected through the plate heater 26 and through the four plunger heaters 22. A pilot light 134 is also connected in this line together with an adjustable thermostatic control 136 for regulating the amount of heat desired through the resistance wires of the plate heater and the plunger heaters.

From the above and foregoing description it can be seen that I have provided a completely automatic apparatus for toasting pockets into fresh buns and also at the same time toasting the surface of the top part of the cut off bun so that when the cavity of the bun is filled with a semi-liquid sandwich filling the same is practically leak proof and the contents of the sandwich will not spill upon the person's clothing or be dropped to the floor.

By the use of the motor, the drive, and its relation to the cover of the heating section of the machine, it can be seen that the entire operation is automatically performed and both audible and visible signals are given when a toasting operation has been completed. At the same time the motor is stopped so that there will be no operation of the machine until the prepared buns have been removed and fresh buns have been placed in the heating cavities.

I contemplate that changes and modifications may be made in the exact details shown and I do not wish to be limited in any particular; rather what I desire to secure and protect by Letters Patent of the United States is:

1. Apparatus for making toasted pockets in buns which comprises a base having an aligned row of shallow cavities, a cover for said base having plunger members secured to the bottom side thereof and in alignment with said row of shallow cavities, said cover member hingedly mounted along its back edge on said base, a heater member in each of said plungers, a lifter plate attached to one side of said cover plate, a motor, a disc rotated by said motor, a roller carried by said disc underlying said lifter plate and adapted to raise the same after a time period of operation of said plunger heaters in buns positioned in said cavities.

2. Apparatus for making toasted pockets in buns which comprises a base having an aligned row of shallow cavities, a cover for said base having plunger members secured to the bottom side thereof, said cover member hingedly mounted along its back edge on said base, a heater member in each of said plungers, a lifter plate attached to one side of said cover plate, a motor, a disc having a notch in its periphery rotated by said motor, a roller carried by said disc underlying said lifter plate and adapted to raise the same after a time period of operation of said plunger heaters in buns positioned in said cavities, an electric buzzer, a buzzer switch, and a roller on said buzzer switch adapted to engage said notch to actuate said buzzer after each toasting operation.

3. A machine for toasting the bottom surface of the cut off top of a fresh bun and simultaneously compressing and toasting a cylindrical cavity in the rest of the bun, comprising a base having two rows of cavities therein, one row of cavities for holding the bun and one row of shallow cavities for holding the cut off top of the bun, a cover member hingedly mounted along its back edge on the back edge of said base, said cover member having a plurality of plunger heater members, one for each bun cavity, and a flat strip heater overlying said row of shallow cavities, said heater members and strip heater connected to the underside of said cover, a ledge extending from one side of said cover, a motor mounted on said base adjacent said ledge, a disc driven by said motor, said disc having a notch in its periphery, a roller mounted on the side of said disc, said roller adapted to engage beneath said ledge to raise said cover after a toasting operation, a buzzer switch, a motor shut-off switch and a roller associated with each of said switches, each roller actuating its switch when it engages the notch in said disc.

References Cited in the file of this patent

UNITED STATES PATENTS

| | | |
|---|---|---|
| 1,512,674 | Campbell | Oct. 21, 1924 |
| 1,956,130 | Neuberger | Apr. 24, 1934 |
| 2,222,314 | Husk | Nov. 19, 1940 |
| 2,243,137 | Vaughan | May 27, 1941 |
| 2,604,841 | Kirby | July 29, 1952 |
| 2,632,379 | Kudo | Mar. 24, 1953 |
| 2,788,427 | Fresone et al. | Apr. 9, 1957 |